(12) United States Patent
Pant (10) Patent No.: US 8,015,057 B1
(45) Date of Patent: Sep. 6, 2011

(54) METHOD AND SYSTEM FOR ANALYZING SERVICE OUTSOURCING

(75) Inventor: Maneesh Pant, Gurgaon (IN)

(73) Assignee: Genpact Global Holding, Luxembourg (LU)

( * ) Notice: Subject to any disclaimer, the term of this patent is extended or adjusted under 35 U.S.C. 154(b) by 1150 days.

(21) Appl. No.: 11/786,134

(22) Filed: Apr. 11, 2007

Related U.S. Application Data (60) Provisional application No. 60/839,133, filed on Aug. 21, 2006.

(51) Int. Cl.
*G06F 9/46* (2006.01)

(52) U.S. Cl. ...................................... 705/7.39

(58) Field of Classification Search ................ 705/7, 11
See application file for complete search history.

(56) References Cited

U.S. PATENT DOCUMENTS

| | | | | |
|---|---|---|---|---|
| 5,765,138 A * | 6/1998 | Aycock et al. | ..................... | 705/7 |
| 7,350,209 B2 * | 3/2008 | Shum | ............................. | 718/104 |
| 7,747,572 B2 * | 6/2010 | Scott et al. | ..................... | 707/636 |
| 2003/0097296 A1 * | 5/2003 | Putt | ................................. | 705/11 |
| 2004/0210574 A1 * | 10/2004 | Aponte et al. | ..................... | 707/5 |

OTHER PUBLICATIONS

Sarkar et al (Evaluation of a supplier capability and performance: A method for supply base reduction), 2006, Journal of Purchasing and Supply Management, pp. 148-163.*
Ajauro et al (Managing Interface with Suppliers), Dec. 1999, International Marketing Management 28, pp. 498-506.*
Lowell "Managing your outsourcing vendor in the financial services industry. (Tutorial)", May 1992, Journal of Systems Management, v43 , n5 , p. 23(6).*

* cited by examiner

*Primary Examiner* — Romain Jeanty
(74) *Attorney, Agent, or Firm* — William L. Botjer (57) ABSTRACT

A method and system for analyzing outsourcing of services such as engineering, and ranking suppliers for all activities to ensure quality, controllership and optimum costs, is provided. Outsourcing involves delegating a plurality of activities to a plurality of suppliers. The activities and the suppliers are scored to generate scorecards. Thereafter, an index is calculated, based on the scorecards. Subsequently, the index, along with scorecards, is utilized to rank and select suppliers for all outsourced activities.

18 Claims, 11 Drawing Sheets

SUPPLIER SCORECARD

| SUPPLIERS | Testing | Standardization & Customization | Specification & Finalization | Dynamic and strength Analysis | Design Modification | Process Analysis | 3D Modeling | Electrical Detailing | Customer Manuals | Drafting 3D | Bill of Material Issue | Drafting 2D | |
|---|---|---|---|---|---|---|---|---|---|---|---|---|---|
| 106b | 3.50 | 4.00 | 2.50 | 3.50 | 3.17 | 2.83 | 4.00 | | 2.67 | | | 3.17 | 4.00 |
| 106a | | | | | 3.00 | | | | | 3.00 | | | 3.07 |
| 106h | 3.00 | | | | 3.00 | | | | | | | | 3.00 |
| 106d | | 4.00 | | | | | | | | | | | 3.00 |
| 106e | | | | | | | | | | | | | 3.00 |
| 106f | 3.00 | 4.00 | 3.00 | 3.33 | 3.20 | 2.75 | | 2.7 | 2.20 | 3.00 | 2.93 | 2.50 | 2.86 |
| 106j | 2.82 | 3.11 | 2.33 | 3.08 | 2.95 | 2.7 | 4.00 | 2.9 | 1.00 | 2.9 | 2.00 | 2.68 | 2.85 |
| 106c | 3.09 | 3.00 | 2.17 | 2.82 | 3.08 | 2.6 | 2.3 | 2.50 | 2.50 | 2.8 | 2.00 | 2.60 | 2.85 |
| 106i | 2.50 | 3.00 | 2.50 | 2.64 | 3.00 | 2.50 | 2.58 | 2.00 | 2.92 | 2.33 | 2.67 | 3.40 | 2.82 |
| 106g | 3.00 | 3.00 | 2.50 | 2.43 | 3.25 | | | 1.00 | 3.00 | | 3.29 | | 2.80 |
| 106k | 2.00 | | 2.61 | 2.60 | 2.41 | 2.76 | | | 3.00 | 2.00 | 3.33 | 3.10 | 2.64 |
| 106l | 2.45 | 3.00 | 2.50 | 2.80 | 2.68 | 2.43 | 2.81 | 2.40 | 2.67 | 2.65 | 2.60 | 2.67 | 2.64 |
| 106m | 2.43 | 2.29 | 2.50 | 2.43 | 2.76 | 2.08 | | 2.60 | 2.71 | 2.50 | 2.33 | 2.23 | 2.60 |
| 106n | 2.88 | | 2.00 | 2.76 | 2.65 | 2.29 | | 3.00 | | 2.24 | 3.11 | 2.53 | 2.59 |
| 106o | 2.20 | | | 2.46 | 2.45 | 2.28 | 2.16 | 2.00 | | 2.19 | 2.00 | 2.27 | 2.35 |
| 106p | 2.59 | | 1.97 | 2.00 | 2.31 | 1.86 | 2.20 | | 1.57 | 1.33 | 2.00 | 1.86 | 2.32 |
| 106q | 2.46 | | 1.00 | 2.29 | 2.67 | 2.20 | | | | 1.64 | 1.00 | 2.63 | 2.24 |
| 106r | 1.71 | | | 1.80 | 2.15 | 2.27 | | | | 1.81 | | 2.23 | 2.15 |
| 106s | 1.90 | 2.00 | 2.00 | 1.83 | 2.15 | | | | 2.00 | | | 2.46 | 2.14 |
| 106t | | | | | | | | | | | | | 2.00 |
| | 2.62 | 2.81 | 2.34 | 2.58 | 2.70 | 2.41 | 2.54 | 2.47 | 2.52 | 2.41 | 2.78 | 2.59 | 2.57 |

FIG. 5a

Supplier Scorecard 108o

| Suppliers | Sub-div 1 | Sub-div 2 | Sub-div 3 | Sub-div 4 | Sub-div 5 | Sub-div 6 | Sub-div 7 | Sub-div 8 | Sub-Div 9 | Sub-Div 10 | Sub-Div 11 | Sub-Div 12 | Sub-Div 13 | Sub-Div 14 | Sub-Div 15 | Sub-Div 16 | Grand Total | Total Divisions using the Supplier |
|---|---|---|---|---|---|---|---|---|---|---|---|---|---|---|---|---|---|---|
| 106b | | | | | | | | 4.00 | 4.00 | | | | | | | | 4.00 | 2 |
| 106a | | 3.33 | | | | | | | | | | | | 3.33 | 3.00 | | 3.29 | 2 |
| 106h | | | | | | | | | | | | | | 3.13 | | | 3.13 | 1 |
| 106d | 2.85 | | 2.96 | | | 3.68 | | 3.44 | 3.29 | 2.71 | | | | | | | 3.07 | 3 |
| 106e | | | | | | | | 2.70 | 3.00 | | | | | | | | 3.00 | 1 |
| 106f | 2.67 | | | | 2.00 | | | 3.56 | 2.71 | | | 2.36 | | | | 2.33 | 2.88 | 10 |
| 106j | | | | | | | | 2.13 | | | | | | | | | 2.87 | 5 |
| 106c | | | 2.69 | 3.89 | | 3.11 | 3.75 | | 3.00 | 1.67 | | 2.5 | 3.67 | 3.2 | | | 2.82 | 3 |
| 106i | | | 2.47 | 3.72 | | 2.67 | 3.75 | 2.00 | | | | 2.79 | 2.75 | 2.66 | 3.00 | | 2.81 | 13 |
| 106g | 3.12 | 2.67 | 2.15 | | 3.00 | | 4.00 | 1.20 | 1.50 | 3.25 | 2.75 | 2.57 | 3.29 | 2.63 | 3.00 | 2.18 | 2.78 | 8 |
| 106k | 2.43 | 3.10 | 2.54 | 2.15 | 1.50 | 2.84 | 3.75 | | | | | 2.58 | 3.00 | 2.57 | 2.50 | | 2.75 | 5 |
| 106l | 2.36 | | | 2.50 | 3.00 | 3.00 | | | | 3.40 | | 2.45 | | 3.20 | 3.1 | 2.45 | 2.68 | 16 |
| 106m | 2.47 | | 2.15 | | | 2.66 | 2.00 | 2.00 | 2.20 | | 3.06 | 2.50 | | 2.14 | | | 2.60 | 8 |
| 106n | | | 1.86 | | | 2.00 | 2.00 | 1.33 | | | | | 3.00 | 2.29 | | | 2.58 | 4 |
| 106o | | | | | | | | | | | | | | | | | 2.35 | 9 |
| 106p | 2.14 | | 1.88 | | | | | 1.50 | 1.83 | 2.44 | | 2.38 | 2.33 | | | 1.64 | 2.32 | 8 |
| 106q | 2.67 | | | | | 3.00 | | | | | | | | 3.50 | 3.00 | | 2.25 | 16 |
| 106r | 2.19 | | 1.90 | | | 2.31 | | 2.00 | 2.00 | 1.33 | | | 3.00 | 2.25 | | 1.75 | 2.23 | 5 |
| 106s | | | | | | | | | | | | 2.00 | | | | | 2.13 | 11 |
| 106t | | | | | | | | | | | | | | | | 5 | 2.00 | 1 |
| | 9 | 3 | 9 | 4 | 3 | 9 | 7 | 11 | 9 | 6 | 2 | 9 | 7 | 11 | 6 | 5 | | |

| Activity / Suppliers | Sub-Div 1 | Sub-Div 2 | Sub-Div 3 | Sub-Div 4 | Sub-Div 5 | Sub-Div 6 | Sub-Div 7 | Sub-Div 8 | Sub-Div 9 | Sub-Div 10 | Sub-Div 11 | Sub-Div 12 | Sub-Div 13 | Grand Total | Total Divisions using the supplier | Ranking |
|---|---|---|---|---|---|---|---|---|---|---|---|---|---|---|---|---|
| 106b index |  |  |  |  | 1.40 |  |  |  |  |  |  |  |  | 1.40 | 1 | 1 |
| 502a |  |  |  |  | 4.00 |  |  |  |  |  |  |  |  | 4.00 | | |
| 502b |  |  |  |  | 2.86 |  |  |  |  |  |  |  |  | 2.86 | | |
| 502c |  |  |  |  | 2.62 |  |  |  |  |  |  |  |  | 2.62 | | |
| 402 |  |  |  |  | 2.66 |  |  |  |  |  |  |  |  | 2.66 | | |
| 106c index |  | 0.88 |  |  |  | 1.08 | 1.20 |  |  |  |  |  |  | 1.14 | 2 | 1-NICHE |
| 502a |  | 3.00 |  |  |  | 4.00 | 4.00 |  |  |  |  |  |  | 4.00 | | |
| 502b |  | 2.88 |  |  |  | 3.25 | 2.83 |  |  |  |  |  |  | 3.07 | | |
| 502c |  | 2.69 |  |  |  | 2.98 | 2.98 |  |  |  |  |  |  | 2.98 | | |
| 402 |  | 3.40 |  |  |  | 0.71 | 0.00 |  |  |  |  |  |  | 0.52 | | |
| 106a index |  |  | 1.20 | 0.95 | 1.05 |  |  | 1.00 | 1.13 | 1.11 |  |  |  |  | 8 | 2 |
| 502a |  |  | 4.00 | 3.00 | 3.00 | 1.00 |  | 3.00 | 3.00 | 3.00 |  |  |  | 4.00 | | |
| 502b |  |  | 3.88 | 3.00 | 2.20 | 1.50 |  | 2.89 | 2.86 | 2.51 |  |  |  | 3.07 | | |
| 502c |  |  | 2.82 | 2.63 | 2.69 | 2.69 |  | 2.69 | 2.69 | 2.69 |  |  |  | 2.98 | | |
| 402 |  |  | 3.33 | 3.17 | 2.86 | 3.71 |  | 3.00 | 2.67 | 2.70 |  |  |  | 0.52 | | |
| 106g index |  |  |  |  |  |  |  |  |  |  | 0.75 | 0.94 | 0.68 | 1.84 | 2 | 4 |
| 502a |  |  |  |  |  |  |  |  |  |  | 2.00 | 2.25 | 2.25 | 2.00 | | |
| 502b |  |  |  |  |  |  |  |  |  |  | 1.21 | 2.00 | 2.43 | 2.00 | | |
| 502c |  |  |  |  |  |  |  |  |  |  | 2.00 | 2.00 | 2.69 | 2.45 | | |
| 402 |  |  |  |  |  |  |  |  |  |  | 2.67 | 2.40 | 3.33 |  | | |
| 106e index |  |  |  |  |  | 0.54 |  |  |  | 0.74 |  |  |  | 0.90 | 4 | 3 |
| 502a |  |  |  |  |  | 2.00 |  |  |  | 2.00 |  |  |  | 2.20 | | |
| 502b |  |  |  |  |  | 2.00 |  |  |  | 2.60 |  |  |  | 1.84 | | |
| 502c |  |  |  |  |  | 2.82 |  |  |  | 2.82 |  |  |  | 2.00 | | |
| 402 |  |  |  |  |  | 3.71 |  |  |  | 2.70 |  |  |  | 2.45 | | |
| 106f index | 0.23 | 0.88 |  |  |  | 0.27 | 0.60 | 0.83 | 1.00 | 0.74 | 0.75 | 0.83 | 1.13 | 0.86 | 9 | 5 |
| 502a | 1.00 | 3.00 |  |  |  | 1.00 | 2.00 | 2.50 | 2.67 | 2.00 | 2.00 | 2.00 | 3.75 | 2.58 | | |
| 502b | 1.21 | 2.22 |  |  |  | 1.65 | 1.51 | 2.44 | 2.67 | 1.78 | 1.95 | 2.20 | 2.97 | 2.81 | | |
| 502c | 2.17 | 2.17 |  |  |  | 2.17 | 2.17 | 2.17 | 2.17 | 2.17 | 2.17 | 2.17 | 2.82 | 2.82 | | |
| 402 | 3.40 | 3.40 |  |  |  | 3.71 | 3.33 | 3.00 | 2.67 | 2.70 | 2.67 | 2.40 | 3.33 | 2.07 | | |
| 106d index | 0.58 |  |  |  | 0.70 | 0.81 |  |  |  |  |  |  |  | 0.77 | 3 | 6 |
| 502a | 2.00 |  |  |  | 2.00 | 3.00 |  |  |  |  |  |  |  | 2.16 | | |
| 502b | 2.54 |  |  |  | 3.40 | 2.09 |  |  |  |  |  |  |  | 2.08 | | |
| 502c | 2.88 |  |  |  | 2.88 | 2.88 |  |  |  |  |  |  |  | 2.17 | | |
| 402 | 3.40 |  |  |  | 2.86 | 3.71 |  |  |  |  |  |  |  | 2.86 | | |
| Total Suppliers used by each subdivision | 2.00 | 2.00 | 1.00 | 1.00 | 3.00 | 5.00 | 2.00 | 2.00 | 2.00 | 3.00 | 2.00 | 2.00 | 2.00 | 7.00 | | |

METHOD AND SYSTEM FOR ANALYZING SERVICE OUTSOURCING

RELATED APPLICATIONS

This application claims priority of U.S. Provisional Patent Application Ser. No. 60/839,133, filed on Aug. 21, 2006, which is hereby incorporated by reference as if set forth herein in its entirety.

BACKGROUND OF THE INVENTION

This invention relates in general to the outsourcing of services. More specifically, the invention relates to the outsourcing of engineering services.

Outsourcing may be defined as the delegation of the operations and activities of an organization to external entities, which also involves the transfer of management control and decision-making to the external entities. These external entities may be subcontractors or suppliers who specialize in various operations. Examples of such operations and activities include customer support, health services, and engineering services.

Various engineering organizations are involved in New Product Introduction (NPI) and requisition activities. Requisition activities involve the execution of design modifications in existing designs. Engineering organizations outsource a significant part of their engineering activities to engineering service providers, who are also known as suppliers. These organizations streamline the total outsourcing process to maximize quality as well as optimize the number of suppliers and costs, to achieve maximum control, ownership and transparency.

Outsourcing also involves a study of the entire outsourcing pattern relating to the various sub-divisions of the engineering department in the organization. The study helps to classify and categorize all outsourced activities and suppliers. This classification is further utilized to quantitatively analyze and create an optimal mix of suppliers with respect to the activities being outsourced. Such an analysis requires an analysis model or method that can automatically evaluate the activities, as well as the suppliers, based on certain predetermined rule sets. The evaluation may also help to map the activities of the organization to the suppliers' quality, cost and competency. This evaluation process may also help to map the complexity and outsourceability of the activities.

Moreover, organizations require a method that can help to optimize the total number of suppliers for better control. The optimization of the total number of suppliers eliminates poor performing suppliers with minimal organizational impact. Additionally, organizations need to identify activities that require new suppliers because of the poor quality of the existing suppliers. This initiative may also form a part of an organizational strategy to tap global suppliers for cost benefits, while retaining the niche expertise of local suppliers.

Conventionally, there exists a method for determining the outsourceability of various activities in business processes that can be outsourced. This is determined by providing a score for business process activities. Thereafter, the activities are ranked, based on the scores. The high rank of an activity may signify its high outsourceability. However, conventional methods may not analyze each activity corresponding to each supplier. Therefore, it is difficult to rank and select a supplier, based on the activities or services provided by the plurality of suppliers. Moreover, such conventional methods may involve manual intervention during scoring and ranking of suppliers and activities.

Another existing method provides a cost-value analysis of the suppliers, for outsourcing. The method involves evaluating the suppliers, based on various evaluation criteria such as their technical and managerial skills and cost. Subsequently, a supplier is selected from the available suppliers. However, the cost-value analysis may vary with local conditions such as government rules, customer standards and environmental conditions. Moreover, the method may not analyze each activity corresponding to each supplier. Additionally, the method involves manual intervention for evaluating the suppliers.

In light of the foregoing discussion, there is a need for a method and system for analyzing the outsourcing of engineering services. The method should analyze each activity of each supplier. Moreover, the system should reduce manual intervention during analysis.

SUMMARY OF THE INVENTION

An object of the invention is to provide a method and system for analyzing the outsourcing of engineering services.

Various exemplary embodiments of the invention provide a method for analyzing the outsourcing of various activities of engineering services to different suppliers. According to the method, each activity among the plurality of activities in the engineering services being outsourced is scored to generate an activity scorecard. This activity scorecard reflects the complexity of the execution and the ease of outsourceability of the activity. Similarly, each supplier from the plurality of suppliers is scored to generate various supplier scorecards. These supplier scorecards reflect the performance and competency of the suppliers. The various scorecards are generated, based on a predetermined rule set in a database. Thereafter, an index is calculated, based on the activity scorecard and the supplier scorecards. The calculated index is utilized to rank the suppliers. Further, the suppliers may be selected, based on the ranks, cost, business volume of the suppliers, and various other factors.

Various exemplary embodiments of the invention provide a system for analyzing the outsourcing of various activities to different suppliers. The system comprises a database that stores information pertaining to various activities and suppliers. The database also includes a predetermined rule set, based on which the scoring is performed. A scoring module scores the various activities and suppliers, to generate scorecards. Thereafter, a ranking module utilizes the generated scorecards to calculate the index and rank suppliers for all activities. Subsequently, the system classifies the suppliers into local and global suppliers. The system also lists and displays the names of the suppliers along with their classification.

BRIEF DESCRIPTION OF THE DRAWINGS

The embodiments of the invention will hereinafter be described in conjunction with the appended drawings, provided to illustrate and not to limit the invention, wherein like designations denote like elements, and in which.

DETAILED DESCRIPTION OF EMBODIMENTS

Embodiments of the invention provide a method, system, and computer program product for analyzing the outsourcing of engineering services. Examples of engineering services include manufacturing, technical support, customer support, and testing, amongst others.

Figure 1:
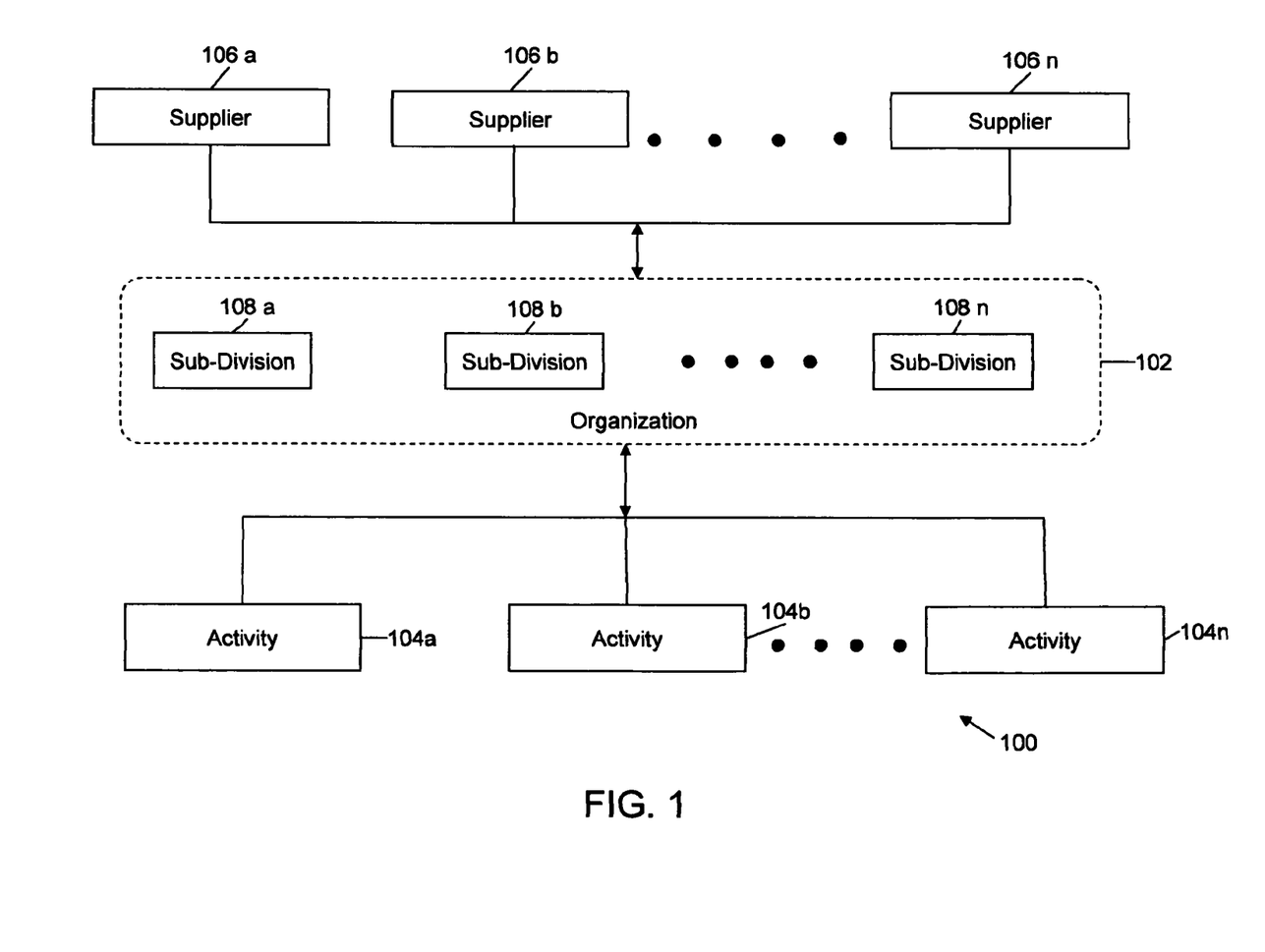
FIG. 1 is a block diagram illustrating an environment for analyzing the outsourcing of various activities to various suppliers, in accordance with an exemplary embodiment of the invention.

FIG. 1 is a block diagram illustrating an environment 100 for analyzing the outsourcing of activities 104 to suppliers 106, in accordance with an exemplary embodiment of the invention. Environment 100 includes an organization 102 that is divided into sub-divisions 108. Sub-divisions 108 a to n are identified based on different aggregates of the products that are handled by organization 102. For example, in a chemical company the different aggregates of the products can be the various products and by-products of a chemical reaction. Sub-divisions 108 can also be identified based on the type of activities 104 a to n being executed in organization 102. Organization 102 may delegate some of activities 104 to suppliers 106 a to n. Examples of activities 104 in an outsourcing service such as engineering include, but are not limited to, drafting 2D, electrical detailing, modeling and drafting 3D, bill of material issue, process analysis, specification writing, customer manuals, standardization and customization, dynamic and strength analysis, design modification, and testing.

Figure 2:
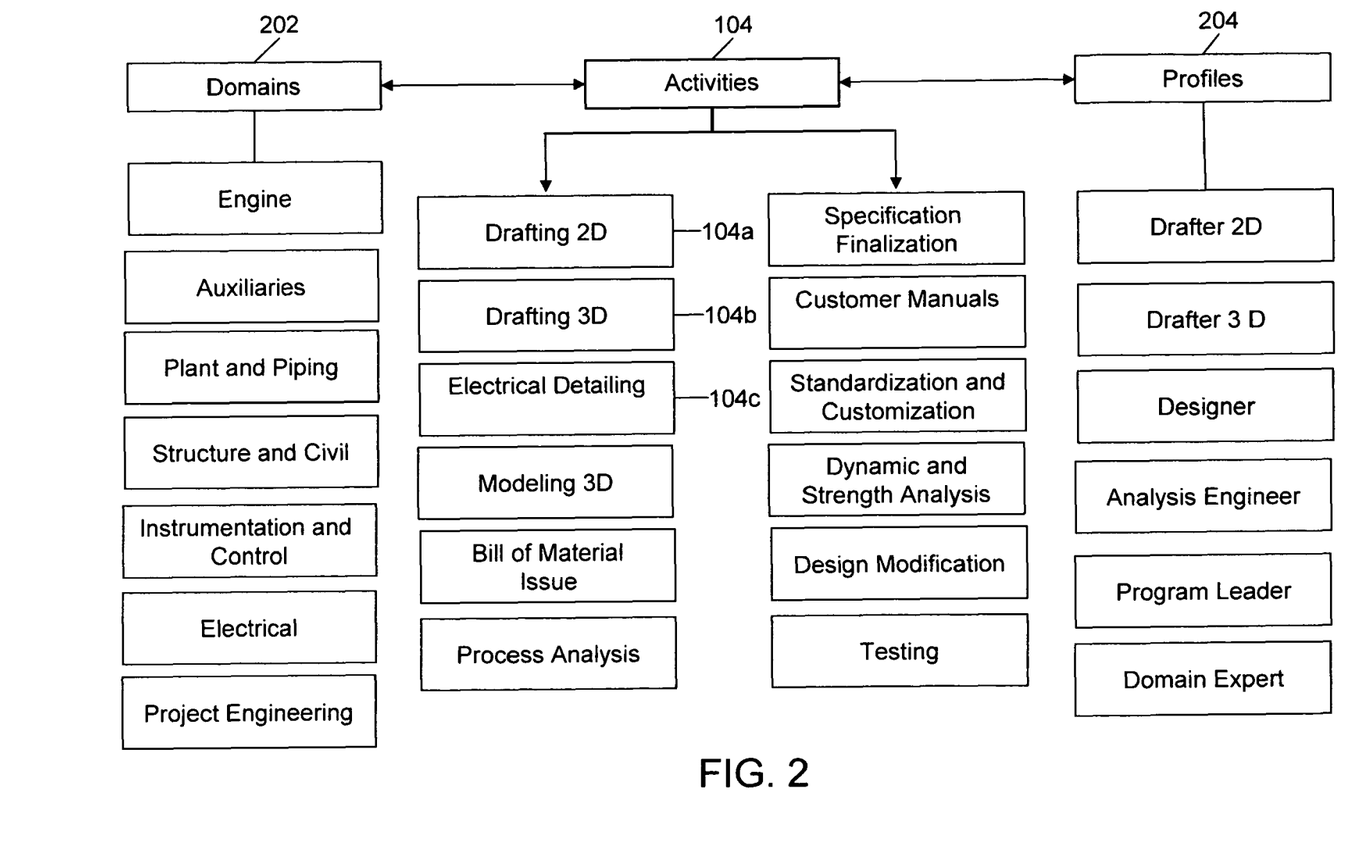
FIG. 2 is a block diagram illustrating the various activities, domains and profiles, in accordance with an exemplary embodiment of the invention.

FIG. 2 is a block diagram illustrating various activities 104, domains 202 and profiles 204, in accordance with an exemplary embodiment of the invention. Domains 202 are the business or technical fields where activities 104 can be performed. For example, drafting 2D activity can be performed for the instrumentation domain as well as for engine domain. Profiles 204 denote the designation of individuals who perform activities 104. For example, drafting 2D activity may be performed by a 2D drafter and dynamic and strength analysis by an analysis engineer.

Examples of domains 202 in an engineering organization include, but are not limited to, engines, auxiliaries, plants and piping, structure and civil, instrumentation and control, electrical, project engineering, and turbine machines. Examples of profiles 204 in an engineering organization include, but are not limited to, a 2D-drafter, 3D-drafter, designers, analysis engineers, program leaders and domain experts. Information pertaining to domains 202, profiles 204, and activities 104 of organization 102 is stored in a database. The information related to domains 202 and profiles 204 are stored in a database which is explained in detail in conjunction with FIGS. 3 and 4.

Figure 3:
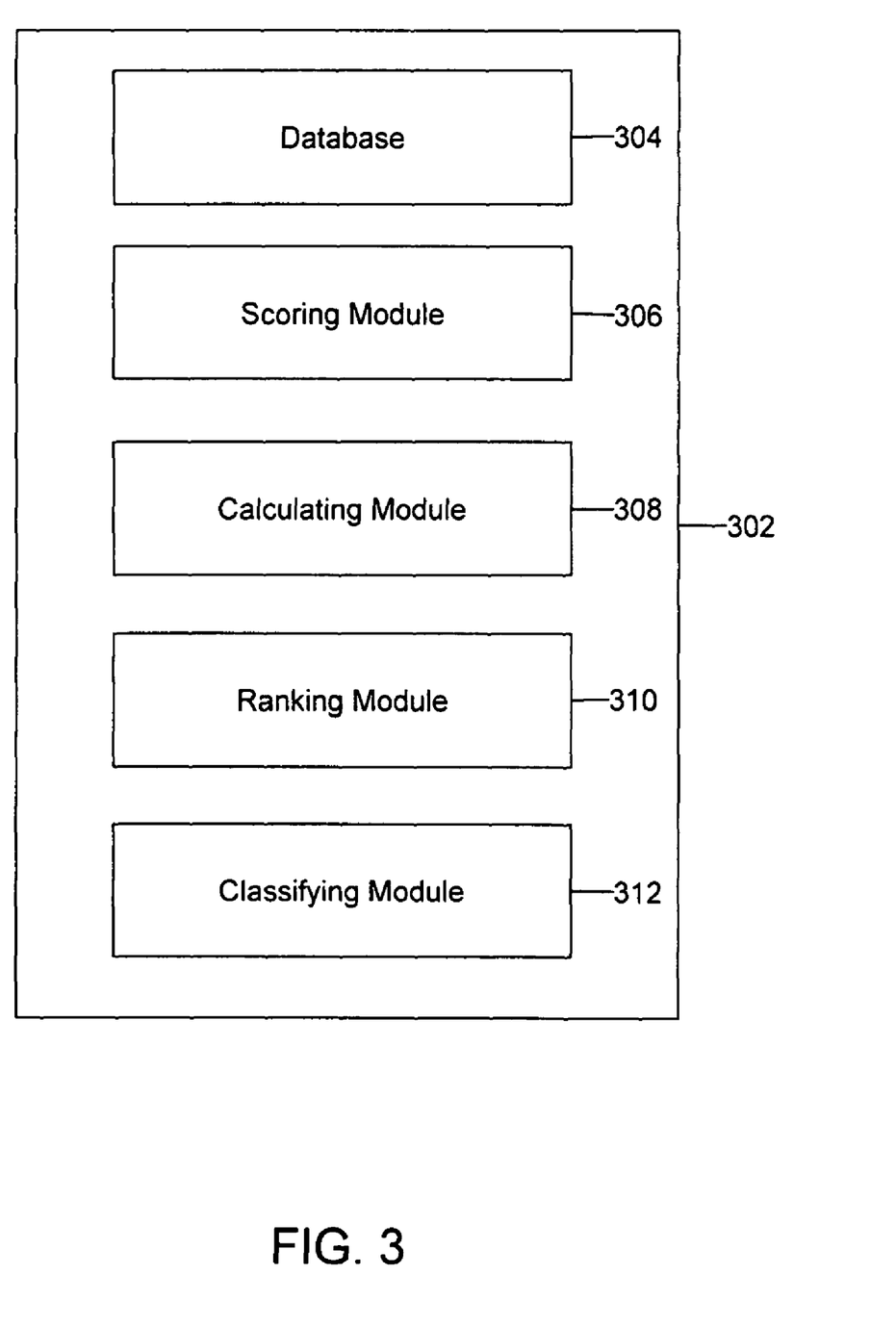
FIG. 3 is a block diagram illustrating a system for analyzing the outsourcing of various activities to various suppliers, in accordance with an exemplary embodiment of the invention.

FIG. 3 is a block diagram illustrating a system 302 for analyzing the outsourcing of various activities 104 to suppliers 106, in accordance with an exemplary embodiment of the invention. System 302 includes a database 304, a scoring module 306, a calculating module 308, a ranking module 310, and a classifying module 312.

Database 304 includes information pertaining to activities 104, suppliers 106, domains 202, and profiles 204. In accordance with an exemplary embodiment of the invention, database 304 includes tables that store information pertaining to activities 104, suppliers 106 and various parameters related to activities 104 and suppliers 106. The tables are linked to each other such that the information can be correlated. Examples of database 304 include MS Access™, MS Excel™ or other suitable databases and/or web-based database applications. Moreover, database 304 includes information relating to the various parameters such as activity parameters and supplier parameters.

The activity parameters and supplier parameters are selected based on data collected for the past performance of the organization. The information pertaining to activities 104, suppliers 106 and various parameters related to activities 104 and suppliers 106 is stored in database 304 during initial configuration of system 302.

Examples of the activity parameters of organization 102 that is involved in engineering processes, include, but are not limited to, knowledge levels pertaining to software tools, organizational products, engineering, government rules and regulations, customer standards, environmental conditions, international standards, communication, complexity of the inputs required to be communicated, and the organizational comfort level. Supplier parameters involve the technical and non-technical competency of suppliers 106. Technical competency is related, but not limited to, the knowledge and ability of suppliers 106 in technical spheres such as engineering, software tools, government rules, as well as the products of organization 102, the standards of its customers, and environmental conditions (in areas where products are to be used) and domains 202. The non-technical competency of suppliers 106 is related, but not limited to, aspects such as dependability, transparency, controllership, communication, and trust and confidence. Database 304 includes values corresponding to each of the various parameters. The values of the various parameters can be numeric such as 1, 2, 3 and 4, a relevance factor or a weighting.

In accordance with an exemplary embodiment of the invention, each of the technical and non-technical competencies of suppliers 106 is given a 50 percent weighting of its value.

Scoring module 306 scores each activity 104, based on the activity parameters of activities 104. This scoring results in a score for each of activities 104. The scores can be numeric such as 1.0, 2.0 and 3.5.

In accordance with an exemplary embodiment of the invention, a score of 3.5 indicates high complexity and low outsourceability of the execution of a specific activity. Similarly, a score of 2.0 indicates high outsourceability and low complexity of the execution of the specific activity. Therefore, the activity with a score of 2.0 is less complex and can be easily outsourced, as compared to the activity with a score of 3.5. Scoring is performed, based on a predetermined rule set. In accordance with an exemplary embodiment of the invention, the predetermined rule set can be an algorithm, a computer program, or a set of instructions that are stored in database 304. The predetermined rule set is stored in system 302, during the initial configuration of system 302, based on the extensive data collection performed corresponding to the activity parameters and the supplier parameters. The scoring module retrieves the values of the activity parameters from database 304. Thereafter, scoring module 306 provides a score for each of activities 104. Scoring module 306 also generates an activity scorecard, which is explained in detail in conjunction with FIG. 4.

Moreover, scoring module 306 provides a score to suppliers 106, based on the predetermined rule set, to facilitate the ranking of suppliers 106. For example, the rule set stored in database 304 pertains to factors such as quality and adherence to time. Take the instance of various suppliers engaged in a specific activity such as manufacturing. A rule is defined that a supplier delivering work with 80 percent quality and time efficiency of 90 percent is given a score of 3 on a rating scale of 4. Another rule defines that a supplier delivering work with 60 percent quality and time efficiency of 80 percent is given a score of 2 on a rating scale of 4. Similarly, other suppliers can also be given a score for various activities, based on the rule set. The rule set determines the scores to be given to suppliers for various factors. Subsequently, these scores are depicted on the supplier scorecards, which are explained in detail in conjunction with FIGS. 5 a, b, c, and 6.

Scoring, suppliers 106 facilitate the process of assessing the performance of suppliers 106, and their competency with respect to activities 104 performed by suppliers 106. The scores can be numerals such as 1, 2.5 and 3. In accordance with an exemplary embodiment of the invention, a score of 3 indicates the high performance of a specific supplier and a score of 1 indicates low performance. Therefore, the performance of the supplier with a score of 3.0 is high as compared to that of the supplier with a score of 1.0.

Calculating module 308 calculates an index, based on the scorecards generated by scoring module 306. The index is the ratio of the performance of supplier 106a for activity 104a to the complexity of the execution of activity 104a. The suppliers' performance of activity 104a is obtained from the supplier scorecards. Similarly, scores pertaining to the complexity of the activities are obtained from the activity scorecard. Ranking module 310 ranks the suppliers 106, based on the index and the scorecards.

Classifying module 312 classifies suppliers 106, based on the ranks, to list the selected suppliers. Classifying module 312 lists the classified suppliers to select the best suppliers 106 among suppliers 106. Additionally, classifying module 312 displays the names of the selected suppliers on a user interface. In accordance with an exemplary embodiment of the invention, the user interface is a graphical user interface. Ranking and classification of suppliers have been explained in detail in conjunction with FIG. 8.

Figure 4:
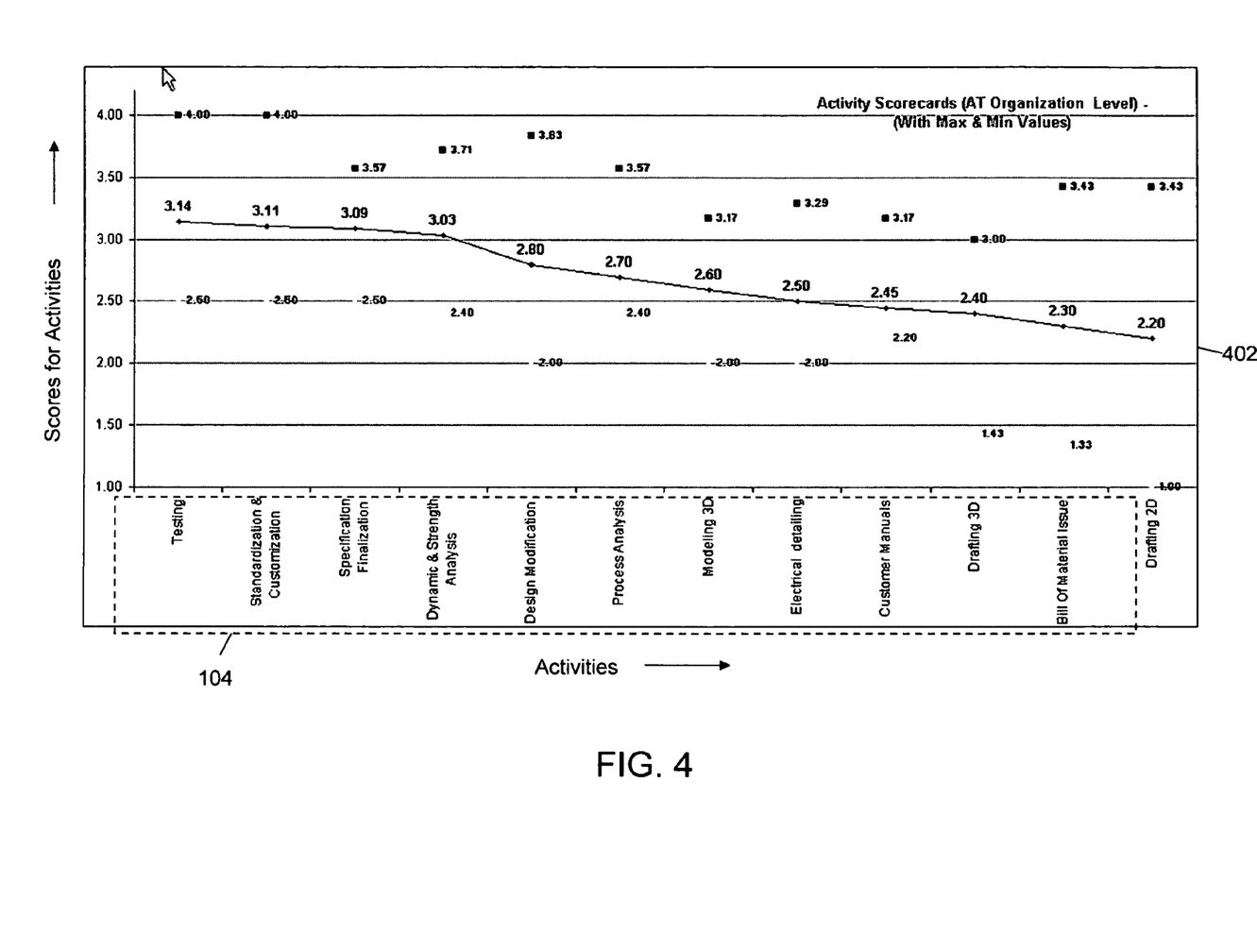
FIG. 4 illustrates an activity scorecard, in accordance with an exemplary embodiment of the invention.

FIG. 4 illustrates an activity scorecard 402, in accordance with an exemplary embodiment of the invention. Activity scorecard 402 is generated by scoring module 306 and depicts the score generated by scoring module 306 for each activity 104. Activity scorecard 402 illustrates activities 104 horizontally and the corresponding scores vertically. The scores corresponding to each activity 104 can be viewed as points on activity scorecard 402. The average scores for activities 104 are connected by lines to form a curve. For example, in activity scorecard 402, an activity such as testing, with a score of 3.14, is more complex and less outsourceable as compared to another activity such as drafting 2D with a score of 2.2. The complexity of executing an activity such as testing implies that testing requires enhanced knowledge and skills for its execution. Therefore, testing may not be outsourced. In addition, a low score for an activity such as 2D drafting indicates that the execution of 2D drafting is not very complex. Therefore, 2D drafting may be easily outsourced.

Activity scorecard 402 also depicts the maximum and minimum scores corresponding to activities 104. There are various scores corresponding to each of activities 104 for various sub-divisions. An activity such as testing may have a score of 4.0 for a subdivision and a score of 2.2 for another subdivision. Testing may have scores between 4.0 and 2.2 for all other sub-divisions. Therefore, testing has a maximum score of 4.0 and a minimum score of 2.5. Activity scorecard 402, in conjunction with the supplier scorecard, facilitates the calculation of the index, to analyze outsourcing. The supplier scorecards are further explained in detail in conjunction with FIGS. 5 a, b, c and 6.

In accordance with various exemplary embodiments of the invention, the score for activities 104 can be a weighted average score, a standard deviation, a variance, or any other statistical value of the scores.

Figure 5A:
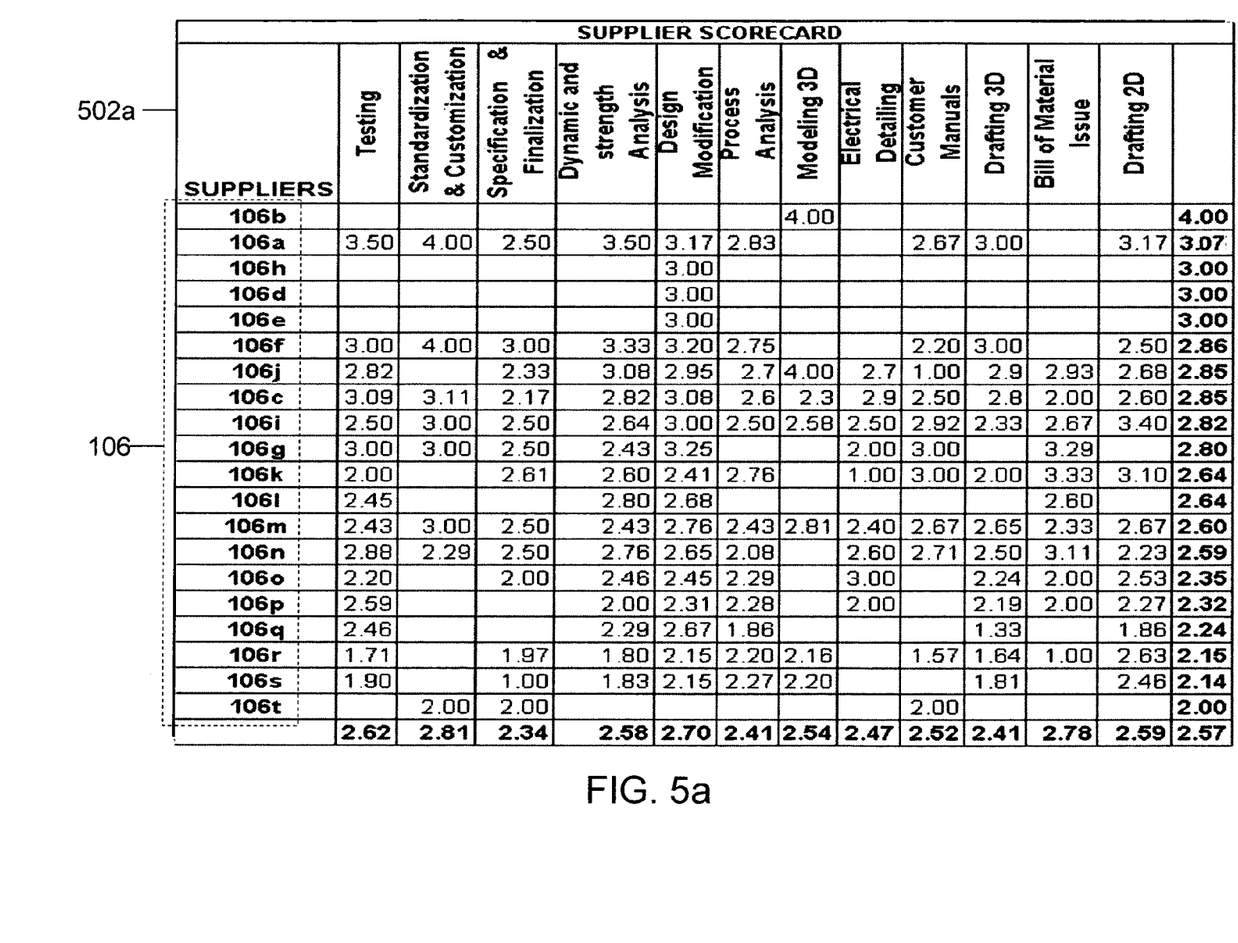
FIG. 5a illustrates a supplier scorecard indicating the performance of each supplier for each activity performed by the supplier for the different sub-divisions, in accordance with an exemplary embodiment of the invention.
Figure 5B:
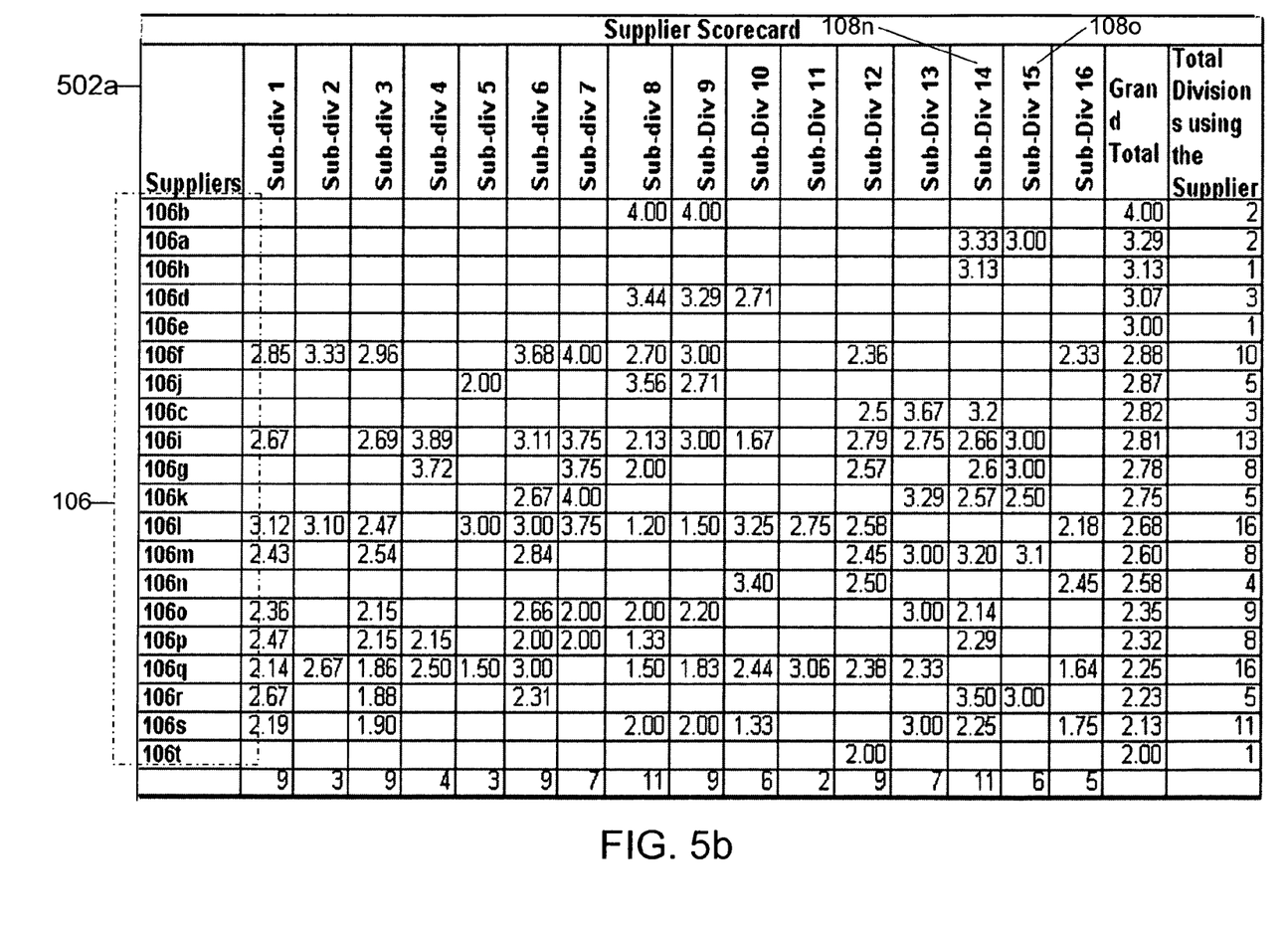
FIG. 5b illustrates a supplier scorecard indicating the performance of the suppliers to each sub-division for the different activities performed by the suppliers, in accordance with an exemplary embodiment of the invention.

FIG. 5a illustrates a supplier scorecard 502a indicating the performance of a supplier for each activity 104 performed by supplier 106 through its service to different sub-divisions 108, in accordance with an exemplary embodiment of the invention. Supplier scorecard 502a depicts the scores of each of suppliers 106 corresponding to activities 104. Activities 104 are displayed horizontally as a column, and suppliers 106 are displayed vertically as a row. The scores of each of suppliers 106 are displayed as a numeral against each of activities 104 in a row. Additionally, the average score of each of suppliers 106 is displayed in a column. The scores of suppliers 106 for various activities 104 can also be depicted, corresponding to each of sub-divisions 108. This facilitates the process of evaluating the performance of suppliers 106 for each sub-division 108. FIG. 5b depicts supplier scorecard 502a, indicating the performance of suppliers 106 to each sub-division 108 through different activities 104 performed by suppliers 106. For example, in FIG. 5b, supplier scorecard 502a depicts a score of 3.33 for sub-division 108n and a score of 3.0 for sub-division 108o for supplier 106a.

Supplier scorecard 502a facilitates the process of analyzing the performance of suppliers 106 for activities 104 at sub-division 108 and organizational levels. A score of less than 2.5 in supplier scorecard 502a indicates the poor performance of supplier 106 related to activity 104.

In accordance with an exemplary embodiment of the invention, the scores from activity scorecard 402 and supplier scorecards 5a, b, and c may be utilized to create matrices such as a supplier vs activity matrix, a supplier vs product matrix, a supplier vs domain matrix, a supplier vs division matrix, and vice versa. These matrices can be utilized to study the inter-linkages among activities 104, domains 202 and profiles 204 across organization 102.

Figure 5C:
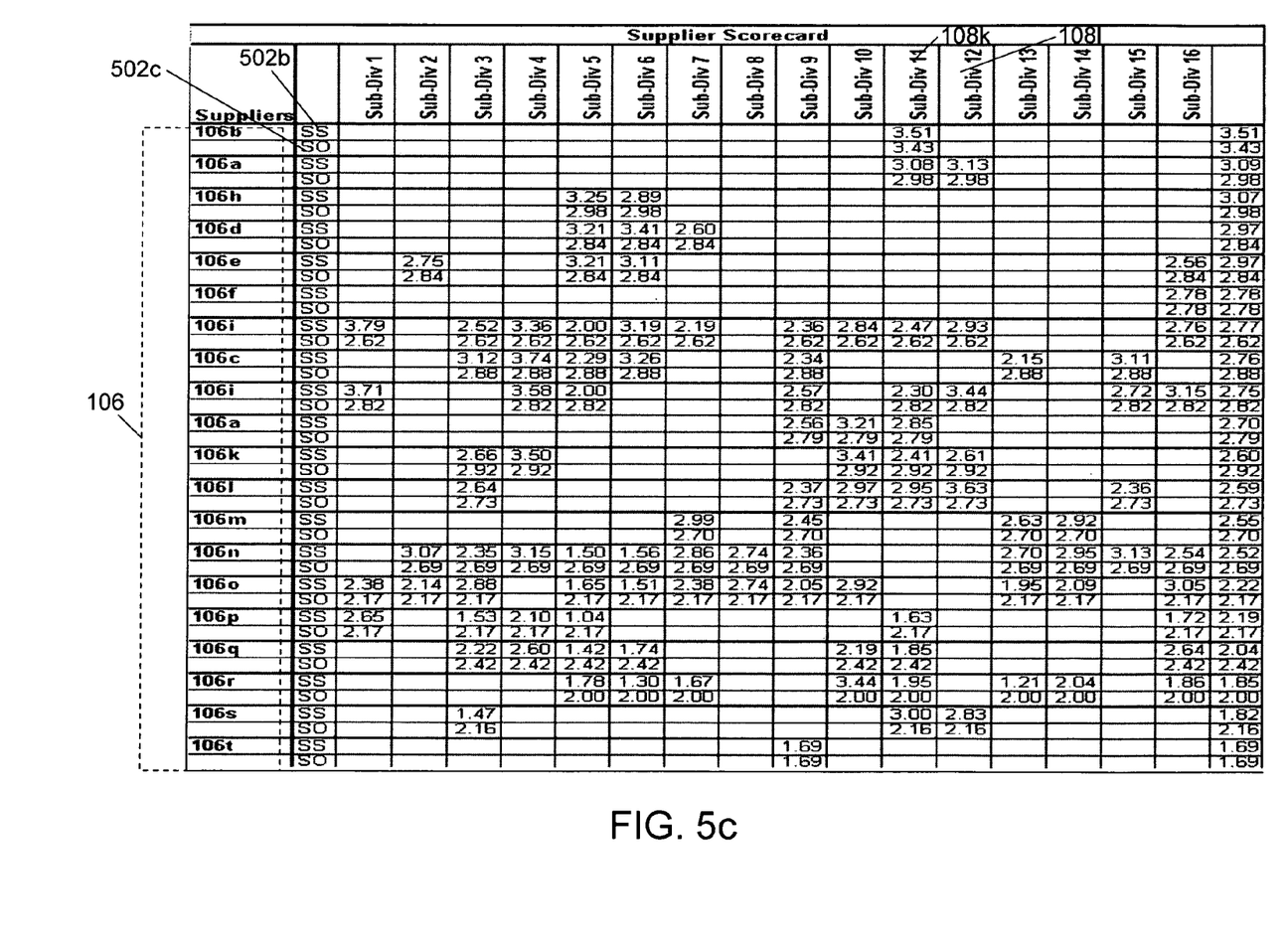
FIG. 5c illustrates a supplier scorecard indicating the competency of the suppliers on an organizational level, in accordance with another exemplary embodiment of the invention.

FIG. 5c illustrates supplier scorecards 502b and 502c, indicating the competency of suppliers 106 at sub-divisions 108 level as well as on an organizational level, in accordance with another exemplary embodiment of the invention. Supplier scorecards 502b and 502c depict a tabular representation of suppliers 106, sub-divisions 108, and the scores for each of suppliers 106. Suppliers 106 are displayed vertically and sub-divisions 108 horizontally.

Figure 6:
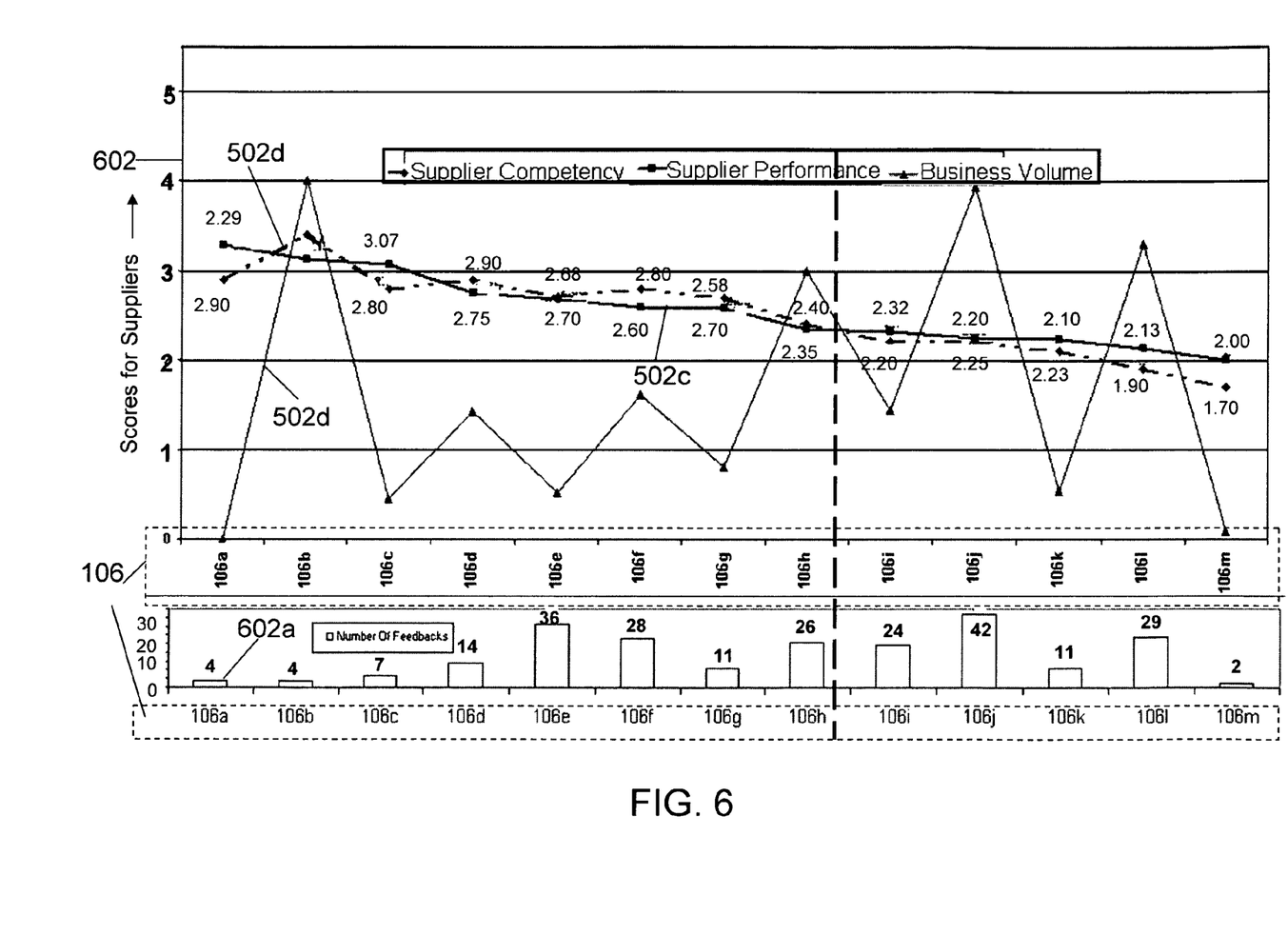
FIG. 6 illustrates a graph indicating the performance, competency and business volume of the suppliers, in accordance with an exemplary embodiment of the invention.

Moreover, FIG. 5c represents two types of scores on supplier scorecards 502b and 502c for each supplier 106. They are Supplier Scorecard (SS) scores and Supplier Overall (SO) scores. SS scores in FIG. 6 represent the scores of suppliers 106 at sub-division 108 level. The SS scores of all the suppliers 106 constitute supplier scorecard 502b. Similarly, the SO scores in FIG. 6 represent the scores of suppliers 106 at the organizational level. The SO scores of all the suppliers 106 at the organizational level constitute supplier scorecard 502c. For example, as shown in FIG. 6, the SS score of supplier 106a is 3.08 for sub-division 108k and 3.13 for sub-division 108l. Similarly, the SO score for supplier 106a is 2.98. The SO score of 2.8 depicts the scores of supplier 106a on the organizational level. Therefore, the SO score remains same through all sub-divisions 108. Hence, each supplier 106 has a single and distinct SO score for various SS scores for sub-divisions 108. In accordance with an exemplary embodiment of the invention, weighting and relevance may be given to sub-divisions 108 to depict SO scores.

In accordance with an exemplary embodiment of the invention, the scores of suppliers 106 and various sub-divisions 108 may be represented in various matrices. In accordance with an exemplary embodiment of the invention, the matrices may be spreadsheets. The matrices may be used to analyze the competency of suppliers 106 at sub-divisions 108 level as well as at the organizational level. The matrices may also be used to cross-examine the outsourceability of different sub-divisions 108 in the event of there being a large difference between the scores of supplier score cards 502 b and 502c of a specific supplier 106a.

FIG. 6 illustrates a graph 602, indicating the performance, competency and business volume of suppliers 106, in accordance with an exemplary embodiment of the invention. Scoring module 306 uses the scores on supplier scorecards 502a and 502c and depicts the average scores of suppliers 106 on graph 602. Graph 602 provides the average scores of suppliers 106, based on competency, performance, and business volume on curves 502 a, 502 c, and 502 d. Therefore, graph 602 facilitates simultaneous analysis pertaining to the competency, performance and business volumes of suppliers 106. For example, graph 602 shows a score of 3.29 for supplier 106a, based on performance, and a score of 2.9, based on competency. In graph 602, two of the three curves represent supplier competency obtained from scorecard 502a, and supplier performance obtained from scorecard 502c. The curve 502 d in graph 602 represents the business volume of suppliers 106. In graph 602, 602 a represents the information pertaining to the past performance of suppliers 106, obtained after extensive data collection during the initial system 302 configuration.

Figure 7:
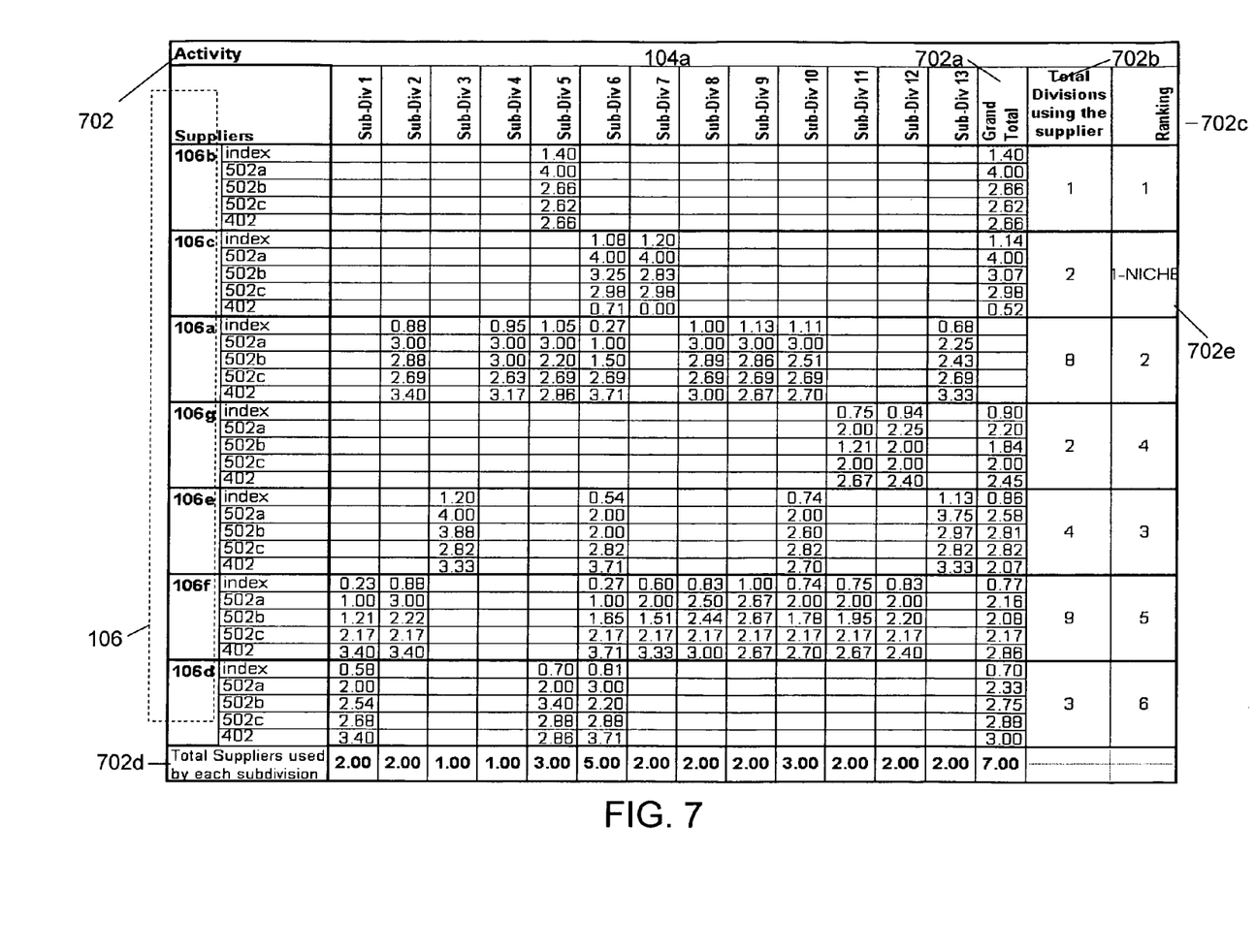
FIG. 7 illustrates a snapshot of various scorecards and indices pertaining to various suppliers, corresponding to an activity, in accordance with an exemplary embodiment of the invention.

FIG. 7 illustrates a snapshot 702 of various scorecards 402, 502a, 502b and 502c and the indices relating to various suppliers 106 for activity 104a. Calculating module 308 retrieves the index and various scores of suppliers 106 for various sub-divisions 108 from various scorecards and depicts them on snapshot 802. For example, snapshot 702 depicts a score of 4.0 in supplier scorecard 502 a corresponding to sub division –5. Additionally, snapshot 702 depicts the average score 702a of a supplier on the organizational level. Further, snapshot 702 depicts the total number 702 b of sub-divisions 108 used by each of suppliers 106. Based on snapshot 702, suppliers 106 are ranked by ranking module 310. Further, the assigned ranks 702 c are depicted on snapshot 702 by ranking module 310. Furthermore, total suppliers used by each subdivision 108 are depicted as 702 d on snapshot 702. For example, sub division 1 uses two suppliers, supplier 106 f and 106 d.

Suppliers 106 are identified as niche, depicted as 702 e in snapshot 702 or local or global suppliers 106 by classifying module 312. Suppliers 106 are identified as local or global suppliers based on their location and the volume of business. The classification of suppliers 106 into local suppliers has been explained in detail in conjunction with FIG. 8.

Figure 8:
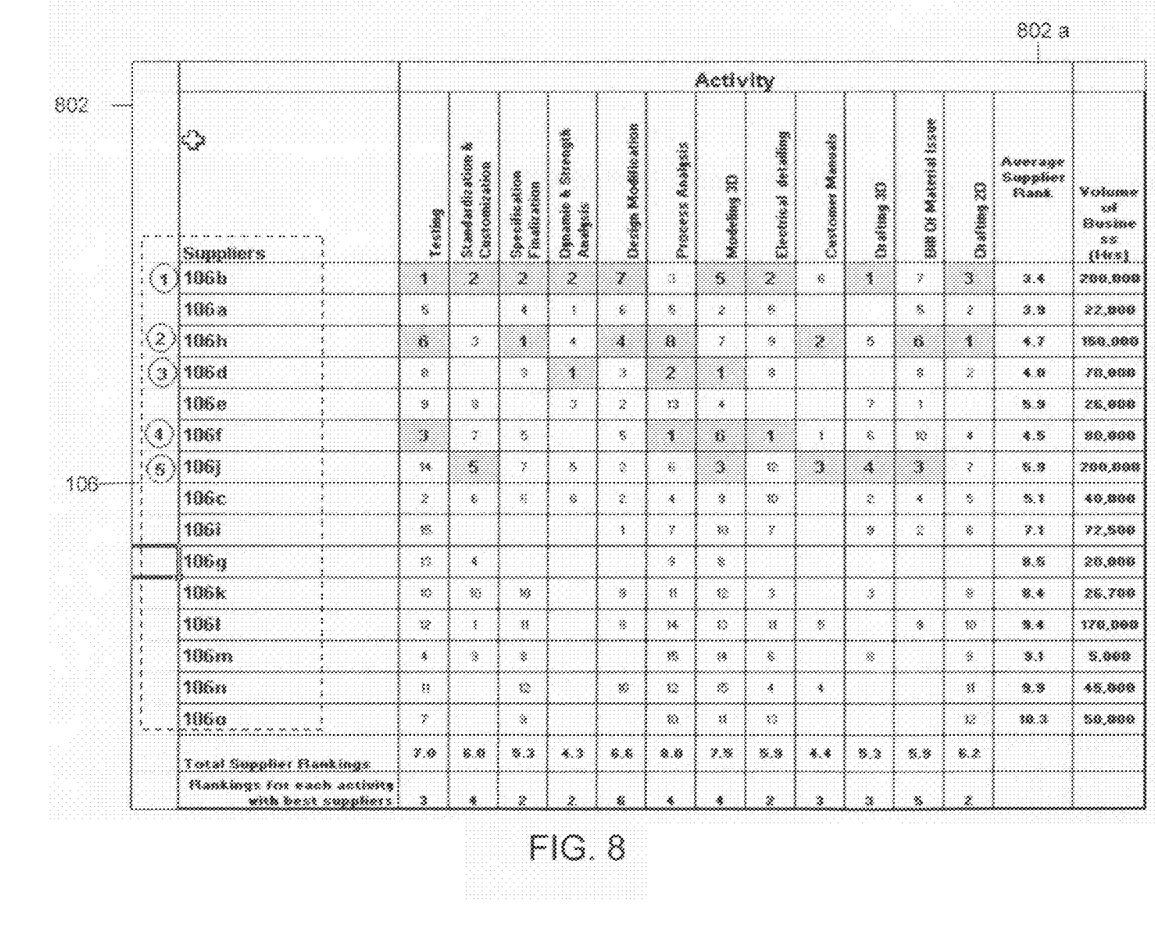
FIG. 8 illustrates the ranking of suppliers, in accordance with an exemplary embodiment of the invention.

FIG. 8 illustrates the ranking of suppliers 106 in a snapshot 802, in accordance with an exemplary embodiment of the invention. Ranking of suppliers 106 is illustrated at the organizational level. Ranking module 310 uses the index, activity scorecard 402 and supplier scorecards 502a, 502b, and 502c to rank suppliers 106. The various ranks of suppliers 106 for activities 104 on the organizational level are illustrated on snapshot 802.

In accordance with an exemplary embodiment of the invention, the ranks may be represented as numerals such as 1, 2, 3 and 4. Rank 1 is the highest rank obtained by a supplier among suppliers 106. Similarly, rank 4, obtained by another supplier, is a lower rank as compared to rank 1.

Ranking module 310 also represents an average supplier rank, depicted as 802a in snapshot 802 for suppliers 106, based on the ranks obtained by suppliers 106 for each of activities 104. The average supplier rank 802 a is the average of the ranks obtained by supplier 106 for all activities 104. The average supplier rank 802a indicates the quality of service provided by suppliers 106 at the organizational level. For example, supplier 106b is ranked 1 for activities such as drafting 3D and testing. However, on the organizational level, the average rank of supplier 106b is 3.4 for all activities 104 performed by supplier 106b.

Snapshot 802 also details the total volume of business provided by each supplier. For example, in FIG. 8, the volume of business of supplier 106b amounts to 200000 hours. In addition, snapshot 802 depicts the total supplier ranking for each activity 104, as well as the ranking for each activity for suppliers 106 that are selected by classifying module 312. For example, snapshot 802 shows selected suppliers as suppliers 106b, 106h, 106d, 106f and 106j. The selected suppliers are marked with circles with numerals such as 1, 2, 3, 4 and 5. Moreover, the shaded regions in snapshot 802 represent the ranks of the selected suppliers 106. Suppliers 106b, 106h, 106d, 106f and 106j are selected, based on the average supplier rank and business volume. Subsequently, activities 104 may be outsourced by organization 102 to selected suppliers 106b, 106h, 106d, 106f and 106j.

In accordance with an exemplary embodiment of the invention, ranking module 310 provides a higher rank to supplier 106a, who has a higher score in supplier scorecard 502a, in the event the indexes for any given number of suppliers 106 are the same. This indicates that a supplier 106 who performs better at the sub-divisional level is ranked higher than other suppliers who do not perform as well. Subsequently, classifying module 312 selects the supplier with the highest average score in supplier scorecard 502a.

In accordance with another exemplary embodiment of the invention, ranking module 310 ranks supplier 106a, who has a higher score in supplier scorecard 502c, higher than other suppliers 106, in the event the indexes and scores in supplier scorecard 502a, for a given number of suppliers 106 are the same. This indicates that a supplier with better competency is preferred, and is ranked higher by ranking module 310.

In accordance with another exemplary embodiment of the invention, ranking module 310 ranks suppliers 106, who are engaged in a greater number activities for sub-divisions 108, higher than other suppliers 106, in the event the index and scores in supplier scorecards 502a and 502c, for a given number of suppliers 106, are the same. This may help in minimizing the total number of suppliers 106 to organization 102.

In accordance with yet another exemplary embodiment of the invention, ranking module 310 ranks suppliers 106, based on the business volume of each supplier 106. This ranking may be based on the infrastructure and rates of suppliers 106. Information pertaining to the infrastructure and rates of suppliers 106 is stored in database 304.

In accordance with an exemplary embodiment of the invention, classifying module 312 classifies suppliers 106 as local and global suppliers. This classification is based on the volume of business, the number of activities 104 being carried out, the nature and volume of activities 104, and the number of sub-divisions 108 being served. In accordance with an exemplary embodiment of the invention, the classification is performed based on a predetermined rule set. For example, a rule set may specify that a supplier providing a business volume above 100,000 Hrs, number of activities undertaken is more than 15, and the number of sub-divisions served are more than 15 are to be classified as a global suppliers. Consequently, the suppliers that do not match this rule set are classified as local suppliers. Classifying module 312 selects a local supplier, who has been awarded the highest possible rank, who serves the maximum number of sub-divisions 108 and thereby minimizes the total number of local suppliers. This facilitates the process of selecting the optimum number of local suppliers of the best quality for all activities 104.

In accordance with an exemplary embodiment of the invention, activities 106 are selected by classifying module 312, where global suppliers 106 have been given the top rank. For example, selecting all the activities 104 where global suppliers 106 have been given the top three ranks. Therefore, activities 104 can be transferred from local to global suppliers 106 to avail of cost advantage without sacrificing quality.

In accordance with an exemplary embodiment of the invention, activities 104 are selected by classifying module 312, where there are either no suppliers that operate globally or only a few suppliers that operate globally in the top ranks. Depending on the volume of activities 104 and the complexity involved, global suppliers 106 are selected by classifying module 312, to avail of cost benefits and/or de-risk the outsourcing process with the minimum number of global suppliers 106.

Figure 9:
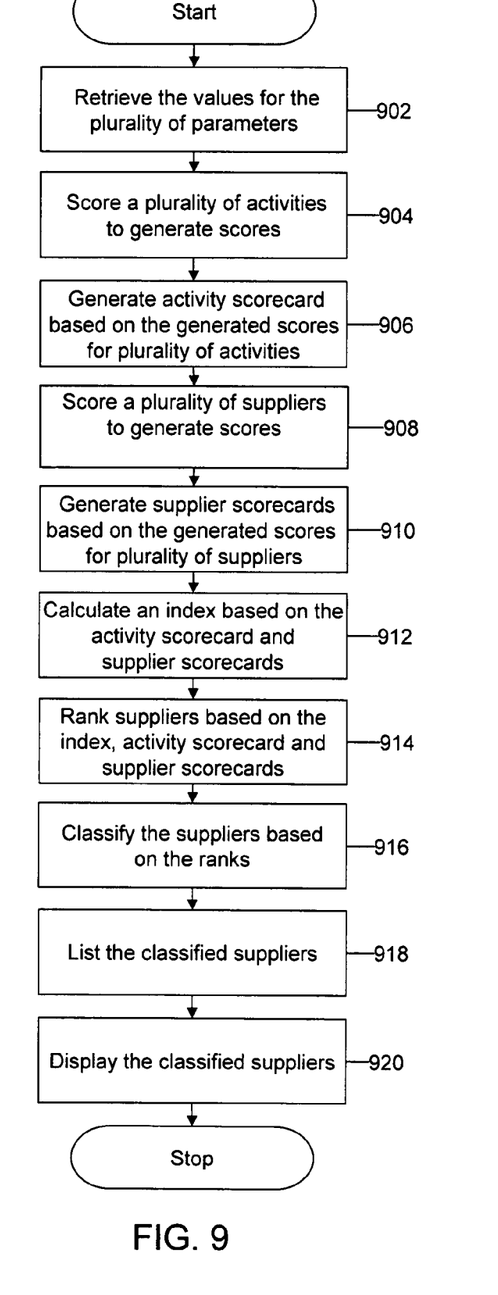
FIG. 9 is a flowchart illustrating a method for analyzing the outsourcing of various activities to suppliers, in accordance with an exemplary embodiment of the invention.

FIG. 9 is a flowchart illustrating a method for analyzing the outsourcing of various activities 104 to suppliers 106, in accordance with an exemplary embodiment of the invention. At step 902, scoring module 306 retrieves the values of various parameters from database 304. The parameters are associated with one or more activities and various suppliers 106. The retrieved values of the various parameters are processed to generate scores based on the predetermined rule set. At step 904, scoring module 306 scores activities 104 to generate scores, based on the predetermined rule set. Further, at step 906, scoring module 306 generates activity scorecard 402 for various activities 104, based on the scores generated by scoring module 306. At step 908, scoring module 306 scores a plurality of suppliers 106, based on the predetermined rule set. During scoring, scoring module 306 generates a score for each of suppliers 106. At step 910, scoring module 304 generates supplier scorecards 502a, 502b and 502c, which are based on the generated scores of suppliers 106.

At step 912, calculating module 308 calculates the index, based on activity scorecard 402 and supplier scorecards 502a, 502b, and 502c. The index is the ratio of the average performance of a specific supplier such as 106a for a specific activity such as 104a to the complexity of the execution of activity 104a. The index is an indication of the performance of supplier 106a in relation to the complexity of activity 104a. The complexity of execution of each of activities 104 is determined and stored in system 302 during initial configuration of system 302. At step 914, ranking module 310 ranks suppliers 106, based on the processed values. The processed values comprise index, activity scorecard 402, and supplier scorecards 502a, 502b and 502c. During ranking, ranking module 310 gives ranks such as 1, 2 and the like, to suppliers 106. Further, at step 916, classifying module 312 classifies suppliers 106 as local or global suppliers 106, based on the ranks. At step 918, classifying module 312 lists the classified suppliers 106 as the best or selected suppliers 106. Listing suppliers 106 facilitates the promotion of quality control and optimum costs during outsourcing. Thereafter, classifying module 312 displays the listed suppliers 106 in a snapshot 802 at step 920.

Various exemplary embodiments of the invention provide a method and system for analyzing outsourcing of engineering services. The method analyzes each activity of each supplier.

Various exemplary embodiments of the invention facilitate tracking future outsourcing.

Various exemplary embodiments of the invention facilitate generating activity vs the profile matrix. This matrix can be used to evaluate suppliers' capabilities in terms of their infrastructure for providing services.

Various exemplary embodiments of the invention provide various scorecards, such as the activity scorecard and the supplier scorecards that can be utilized to select the suppliers.

Various exemplary embodiments of the invention facilitate generating various matrices, such as the supplier vs activity matrix, the supplier vs product matrix, the supplier vs domain matrix, the supplier vs division matrix, and vice versa, can be developed from this analysis to predict trends in future outsourcing. Moreover, these matrices can help in developing future outsourcing strategies.

Various exemplary embodiments of the invention provide supplier rankings that include the effect of both technical and non-technical parameters on outsourcing.

Various exemplary embodiments of the invention facilitate utilizing utilizes a computer system that is used to continuously monitor, control and improve the outsourcing of engineering activities to suppliers, thereby reducing the need for manual intervention.

The system, as described in the invention or any of its components, may be embodied in the form of a computer system. Typical examples of a computer system includes a general-purpose computer, a programmed microprocessor, a micro-controller, a peripheral integrated circuit element, and other devices or arrangements of devices that are capable of implementing the steps that constitute the method of the invention.

The computer system comprises a computer, an input device, a display unit and the Internet. Computer comprises a microprocessor. Microprocessor is connected to a communication bus. Computer also includes a memory. Memory may include Random Access Memory (RAM) and Read Only Memory (ROM). Computer system further comprises storage device. It can be a hard disk drive or a removable storage drive such as a floppy disk drive, optical disk drive and the like. Storage device can also be other similar means for loading computer programs or other instructions into the computer system.

The computer system executes a set of instructions that are stored in one or more storage elements, in order to process input data. The storage elements may also hold data or other information as desired. The storage element may be in the form of an information source or a physical memory element present in the processing machine.

The set of instructions may include various commands that instruct the processing machine to perform specific tasks such as the steps that constitute the method of the invention. The set of instructions may be in the form of a software program. The software may be in various forms such as system software or application software. Further, the software might be in the form of a collection of separate programs, a program module with a larger program or a portion of a program module. The software might also include modular programming in the form of object-oriented programming. The processing of input data by the processing machine may be in response to user commands, or in response to results of previous processing or in response to a request made by another processing machine.

While the preferred embodiments of the invention have been illustrated and described, it will be clear that the invention is not limited to these embodiments only. Numerous modifications, changes, variations, substitutions and equivalents will be apparent to those skilled in the art, without departing from the spirit and scope of the invention, as described in the claims.

What is claimed is:

1. A method for automatically analyzing outsourcing of one or more activities of services to a plurality of suppliers, the method comprising the steps of:
   a. retrieving values for a plurality of parameters from a database, wherein the plurality of parameters are associated with the one or more activities and the plurality of suppliers;
   b. processing the retrieved values based on a predetermined rule set, wherein processing the retrieved values comprises the steps of generating an activity scorecard by scoring each activity of the one or more activities and generating supplier scorecards by scoring each supplier of the plurality of suppliers; and
   c. calculating an index based on the activity scorecard and the supplier scorecards to rank each supplier of the plurality of suppliers,
      wherein the index is a ratio of an average score of a supplier for an activity to complexity in execution of the activity, the complexity in execution of the activity increasing with increase in a score for the activity in an activity scorecard
      wherein the steps of the method is performed by a computer system including a microprocessor.

2. The method of claim 1, wherein the activity scorecard comprises an average score for each activity, the average score is the average of the scores assigned to each activity.

3. The method of claim 2, wherein the average scores are weighted average scores.

4. The method of claim 1, wherein the supplier scorecards comprises an average score for each supplier, the average score is the average of the scores assigned to each supplier.

5. The method of claim 4, wherein the average scores are weighted average scores.

6. The method of claim 1, wherein the values are a weightage.

7. The method of claim 1, wherein the database comprises the predetermined rule set.

8. The method of claim 1 further comprising the step of classifying the plurality of suppliers based on the ranks.

9. The method of claim 8, wherein the step of classifying the plurality of suppliers comprises the steps of:
   a. listing the classified suppliers; and
   b. displaying the listed suppliers on a user interface.

10. The method of claim 1, wherein a higher rank is provided to a supplier with a higher score in supplier scorecards.

11. The method of claim 1, wherein a higher rank is provided to a supplier engaged in greater number of activities.

12. The method of claim 1, wherein the plurality of suppliers is ranked based on business volume.

13. A method for automatically analyzing outsourcing of one or more activities of services to a plurality of suppliers, the method comprising the steps of:
   a. retrieving values for a plurality of parameters from a database, wherein the plurality of parameters are associated with the one or more activities and the plurality of suppliers;
   b. scoring the one or more activities to generate scores based on a predetermined rule set for the retrieved values;
   c. generating an activity scorecard, the activity scorecard being based on the generated scores;
   d. scoring the plurality of suppliers to generate scores based on the predetermined rule set for the retrieved values;
   e. generating supplier scorecards, the supplier scorecards is based on the generated scores;
   f. calculating an index based on the activity scorecard and the supplier scorecards
      wherein the index is a ratio of an average score of a supplier for an activity to complexity in execution of the activity, the complexity in execution of the activity increasing with increase in a score for the activity in an activity scorecard;
   g. ranking the plurality of suppliers based on the index, the activity scorecard and the supplier scorecards;
   h. classifying the plurality of suppliers based on the ranks;
   i. listing the classified suppliers; and
   j. displaying the listed suppliers on a user interface,
      wherein the steps of the method are performed by a computer system including a microprocessor.

14. A computer implemented system comprising a microprocessor for automatically analyzing outsourcing of a one or more activities of services to a plurality of suppliers, the computer implemented system comprising:
   a. a database for storing values for a plurality of parameters, the plurality of parameters being associated with the one or more activities and the plurality of suppliers;
   b. a scoring module configured for scoring the one or more activities and the plurality of suppliers based on the values for the plurality of parameters to generate scores;
   c. a calculating module configured for calculating an index based on the generated scores from the scoring module
      wherein the index is a ratio of an average score of a supplier for an activity to complexity in execution of the activity, the complexity in execution of the activity increasing with increase in a score for the activity in an activity scorecard;
   d. a ranking module configured for ranking the plurality of suppliers based on the index; and
   e. a classifying module configured for classifying, listing and displaying the plurality of suppliers on a user interface.

15. The system of claim 14, wherein the scoring module generates scorecards based on the generated scores.

16. The system of claim 15, wherein the scorecard is an activity scorecard.

17. The system of claim 15, wherein the scorecard is a supplier scorecard.

18. A computer program product for automatically analyzing outsourcing of one or more activities of services, wherein the one or more activities are outsourced to a plurality of suppliers, the computer program product being disposed on a computer readable medium, the computer readable medium comprising:
- a. program instruction means for retrieving values for a plurality of parameters from a database, wherein the plurality of parameters are associated with the one or more activities and the plurality of suppliers;
- b. program instruction means for scoring the one or more activities to generate scores based on a predetermined rule set for the retrieved values;
- c. program instruction means for generating an activity scorecard, the activity scorecard being based on the generated scores;
- d. program instruction means for scoring the plurality of suppliers to generate scores based on the predetermined rule set for the retrieved values;
- e. program instruction means for generating supplier scorecards, the supplier scorecards is based on the generated scores;
- f. program instruction means for calculating an index based on the activity scorecard and the supplier scorecards wherein the index is a ratio of an average score of a supplier for an activity to complexity in execution of the activity, the complexity in execution of the activity increasing with increase in a score for the activity in an activity scorecard;
- g. program instruction means for ranking the plurality of suppliers based on the index, the activity scorecard and the supplier scorecards;
- h. program instruction means for classifying the plurality of suppliers based on the ranks;
- i. program instruction means for listing the classified suppliers; and
- j. program instruction means for displaying the listed suppliers on a user interface.

\* \* \* \* \*